June 20, 1967     J. R. VAN GEUNS ET AL     3,327,265
SUPERCONDUCTIVE DEVICE FOR CAUSING STABLE AND FREE
FLOATING OF A MAGNET IN SPACE
Filed Sept. 22, 1964
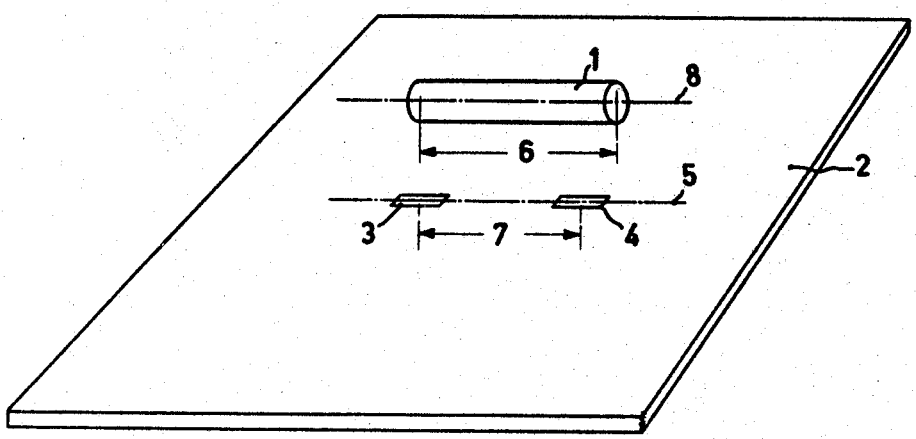
INVENTORS
JOHANNES R. VAN GEUNS &
GIJSBERT PRAST
BY
AGENT 3,327,265
SUPERCONDUCTIVE DEVICE FOR CAUSING STABLE AND FREE FLOATING OF A MAGNET IN SPACE
Johannes Rudolphus van Geuns and Gijsbert Prast, Emmasingel, Eindhoven, Netherlands, assignors to North American Philips Company, Inc., New York, N.Y., a corporation of Delaware
Filed Sept. 22, 1964, Ser. No. 398,312
Claims priority, application Netherlands, Sept. 24, 1963, 298,337
7 Claims. (Cl. 335—216)

This invention relates to suspension systems and more particularly to a frictionless suspension system utilizing the phenomenon of superconductivity for causing stable and free floating of a magnet in space.

It is already known that a bar magnet can float freely in space over a superconducting plate. Since, as is well-known, magnetic lines of force cannot penetrate superconductive material (Meissner effect) eddy currents will occur in the superconducting plate such that a mirror-image effect is produced and the magnet is repelled. In order to prevent the magnet from moving towards the edge of the plate and subsequently falling down along the plate, it has previously been suggested to make the plate cup-shaped. Although the position of the magnet is thus determined, its location in space is not fixed.

According to the invention, the superconductive plate is formed with two apertures wherein the mutual distance therebetween is approximately equal to the distance between the poles of the magnet.

In order that the invention may be readily carried into effect, it will now be described in detail, by way of example, with reference to the accompanying diagrammatic drawing. The figure shows a permanent bar magnet 1 which can float freely over a plate 2 of superconductive material. The plate 2 is arranged in a Dewar vessel (not shown) and is cooled to a temperature below the critical temperature of the superconductive material. A suitable material for the plate is, for example, niobium-tin, the critical temperature of which is comparatively high (18° K.) relative to that of other superconductive materials. The magnet 1 may likewise be arranged inside the Dewar vessel or alternatively externally thereof, in which event a wall of the Dewar vessel is present between the magnet 1 and the plate 2. The plate 2 is formed with apertures 3 and 4.

As previously mentioned, lines of force cannot penetrate superconducting material, and hence eddy currents occur in the plate such that a mirror-image effect is produced and the magnet is repelled. The said mirror-image effect is eliminated, however, at the apertures 3 and 4 and in the vicinity thereof the induced magnetic field is attenuated and hence the repelling action a minimum. Consequently, the axis of the magnet will be directed in parallel with the imaginary line 5 connecting the apertures. It has been found that the distance 6 between the poles of the magnet must preferably be a little larger, for example by 10% larger, than the distance 7 between the centres of the apertures.

The couple necessary to turn the axis of the magnet out of the given preferred position is comparatively great. However, the magnet can rotate freely about its longitudinal axis 8. A magnetic bearing with a very low bearing friction, especially in vacuo, is thus obtained. This is very important, for example, for use in gyroscopes and the like. Although the magnet is floating freely, a certain bearing friction may still occur, however, because of induction effects, resulting in eddy-current losses. In fact, the magnet moves in the mirror-image field produced by it. According to a further aspect of the invention, the said bearing friction may be eliminated by manufacturing the magnet from electrically non-conductive magnetic material.

It should be noted that it is not essential that the plate 2 have a planar shape. Instead, it may be, for example, cup-shaped or may alternatively be constituted, if desired, by a mosaic of small plates of superconductive material provided on a substratum.

The magnet need, in principle, not be permanent magnetic and may alternatively consist of soft-magnetic material, for example ferrite, in which a magnetic field is produced by means of a current-conveying coil.

What is claimed is:

1. A frictionless superconductor suspension system comprising a magnet having first and second spaced apart poles, a plate composed of a superconductor material positioned beneath and confronting said magnet so as to produce a repelling force to cause said magnet to float freely above the plate, said plate having first and second apertures therein spaced apart by a distance approximately equal to the spacing between said magnet poles thereby to fix the position of said magnet above the plate.

2. A suspension system as described in claim 1 wherein the spacing between the magnet poles is a little larger than the distance between the centers of the apertures.

3. A suspension system as described in claim 1 wherein said magnet is composed of a magnetic material which is electrically non-conductive.

4. A frictionless superconductor suspension system comprising an elongated magnet having a longitudinal axis and first and second poles adjacent the respective ends thereof, a plate composed of a superconductor material positioned beneath and confronting said magnet so as to produce a repelling force to cause said magnet to float freely above the plate, said plate having first and second spaced apart apertures therein separated by a distance approximately equal to the spacing between said magnet poles thereby to fix the position of said magnet above the plate.

5. A suspension system as described in claim 4 wherein said first and second apertures comprise first and second elongated axially aligned slots which cause said magnet axis to be fixed in parallel alignment therewith.

6. A suspension system as described in claim 5 wherein said magnet is a cylindrically shaped bar magnet composed of permanent magnet material and free to rotate about said longitudinal axis.

7. A suspension system as described in claim 6 wherein the spacing between the magnet poles is approximately 10 percent greater than the spacing between said apertures.

References Cited
UNITED STATES PATENTS
3,005,117  10/1961  Buchhold.

OTHER REFERENCES
Forces Acting On Superconductors In Magnetic Fields, Journal of Applied Physics, vol. 24, No. 1, January 1953, pp. 19–24.
Shoenberg, Superconductivity, Cambridge Monographs on Physics, 1960, QC 612 S854, pp. 19–24.

BERNARD A. GILHEANY, *Primary Examiner.*
G. HARRIS, *Assistant Examiner.*